(12) United States Patent
Harada

(10) Patent No.: US 7,690,899 B2
(45) Date of Patent: Apr. 6, 2010

(54) PISTON PUMP

(75) Inventor: Tomoo Harada, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 12/138,654

(22) Filed: Jun. 13, 2008

(65) Prior Publication Data

US 2008/0310971 A1    Dec. 18, 2008

(30) Foreign Application Priority Data

Jun. 18, 2007   (JP)  ............................. 2007-160110

(51) Int. Cl.
*F04B 25/00*      (2006.01)
*F04B 1/12*       (2006.01)
(52) U.S. Cl. ...................... 417/254; 417/440; 417/523; 417/554
(58) Field of Classification Search ................ 417/214, 417/364, 415, 545, 546, 554, 552
See application file for complete search history.

(56) References Cited

U.S. PATENT DOCUMENTS

| 2,832,291 | A | * | 4/1958 | Gorsko | ....................... 417/254 |
|---|---|---|---|---|---|
| 3,112,705 | A | * | 12/1963 | Chlebowski | ................. 417/214 |
| 4,086,936 | A | * | 5/1978 | Vork | ...................... 137/533.11 |
| 5,000,525 | A | * | 3/1991 | Reinartz et al. | .......... 303/116.1 |
| 5,004,403 | A | * | 4/1991 | Culbertson et al. | ............. 417/53 |
| 5,281,014 | A | * | 1/1994 | Volz | ......................... 303/116.1 |
| 5,577,896 | A | * | 11/1996 | Harada | ........................ 417/259 |
| 5,593,292 | A | * | 1/1997 | Ivey | ............................ 417/554 |
| 5,897,303 | A | * | 4/1999 | Mueller | ....................... 417/549 |
| 6,146,115 | A | * | 11/2000 | Alaze | .......................... 417/549 |
| 6,457,957 | B1 | * | 10/2002 | Bauer et al. | .................. 417/562 |
| 6,471,496 | B1 | * | 10/2002 | Merklein et al. | ............. 417/569 |
| 6,474,963 | B1 | * | 11/2002 | Wetzel et al. | ................. 417/549 |
| 6,634,872 | B1 | * | 10/2003 | Bougamont et al. | .......... 417/549 |
| 6,652,245 | B2 | * | 11/2003 | Hauser et al. | ................ 417/313 |
| 6,786,232 | B2 | * | 9/2004 | Schuller et al. | ......... 137/543.17 |
| 7,204,565 | B2 | * | 4/2007 | Hinz et al. | ..................... 303/10 |
| 7,322,804 | B2 | * | 1/2008 | Humburg | ..................... 417/416 |

(Continued)

FOREIGN PATENT DOCUMENTS

DE            100 53 992 A1    8/2001

(Continued)

*Primary Examiner*—Devon C Kramer
*Assistant Examiner*—Bryan Lettman
(74) *Attorney, Agent, or Firm*—Buchanan Ingersoll & Rooney PC

(57) ABSTRACT

A piston pump includes a first piston pump including a first piston and a first pump chamber, a second piston pump including a second piston and a second pump chamber, the second piston operating to follow the first piston, a pressure release passage formed in communication with the second pump chamber, and a relief valve provided at the pressure release passage and defining an upper limit discharge pressure of the second piston pump. When a discharge pressure of the second piston pump is equal to or smaller than the upper limit, a discharge fluid of the second piston pump is added to that of the first piston pump so as to flow into an outlet port. When the discharge pressure exceeds the upper limit, the discharge fluid is released to the pressure release passage and the discharge fluid of the first piston pump only flows to the outlet port.

20 Claims, 10 Drawing Sheets

U.S. PATENT DOCUMENTS

| | | | |
|---|---|---|---|
| 7,377,757 B2* | 5/2008 | Walch et al. | 417/554 |
| 7,390,174 B2* | 6/2008 | Dinkel et al. | 417/549 |
| 2001/0002978 A1* | 6/2001 | Siegel et al. | 417/470 |
| 2001/0016171 A1* | 8/2001 | Schuller et al. | 417/545 |
| 2001/0048884 A1* | 12/2001 | Siegel et al. | 417/470 |
| 2003/0012670 A1* | 1/2003 | Summers et al. | 417/549 |
| 2004/0022645 A1* | 2/2004 | Rousset | 417/269 |
| 2005/0276706 A1* | 12/2005 | Radue | 417/417 |
| 2007/0114837 A1* | 5/2007 | Kusano | 303/10 |
| 2008/0006656 A1* | 1/2008 | Tseng | 222/321.9 |
| 2008/0310971 A1* | 12/2008 | Harada | 417/254 |

FOREIGN PATENT DOCUMENTS

| | | |
|---|---|---|
| DE | 10 2005 034 571 A1 | 7/2006 |
| JP | 2001-508854 A | 7/2001 |
| WO | WO 01/55595 A1 | 8/2001 |
| WO | WO 2006/051066 A1 | 5/2006 |

\* cited by examiner

PISTON PUMP

CROSS REFERENCE TO RELATED APPLICATIONS

This application is based on and claims priority under 35 U.S.C. §119 to Japanese Patent Application No. 2007-160110, filed on Jun. 18, 2007, the entire content of which is incorporated herein by reference.

FIELD OF THE INVENTION

This invention generally relates to a piston pump. More particularly, this invention pertains to a power-driven piston pump for a hydraulic brake apparatus for a vehicle equipped with an antilock brake system (ABS), an electronic stability control (ESC), a traction control (TRC), and the like.

BACKGROUND

Known piston pumps each used for a hydraulic brake apparatus for a vehicle are disclosed in JP2001508854A (Reference 1), DE102005034571A1 (Reference 2), and DE10053992A1 (reference 3).

According to the piston pump disclosed in the Reference 1, an annular-shaped body is attached onto an outer periphery of a piston that is driven by a cam so as to perform a reciprocating movement. The body is axially displaceable (i.e., slidable) on the piston and is pressed towards one side by a spring. The body and the piston are inserted into a hydraulic block (precisely, a cylinder formed at the hydraulic block) while respective end portions of the body and the piston face a same pump chamber (i.e., positive displacement chamber).

According to the piston pump disclosed, the piston constitutes a first pump while the body constitutes a second pump. In cases where a thrust force caused by a pressure within the pump chamber is smaller than a pre-stressing force of the spring, the body moves together with the piston. On the other hand, in cases where the thrust force caused by the pressure within the pump chamber is larger than the pre-stressing force of the spring, the body is pressed towards a movement end portion thereof that is located in a direction away from the pump chamber.

That is, until the pressure in the pump chamber reaches a predetermined value (i.e., pump discharge pressure is low), the first pump and the second pump are operated together. When the pressure in the pump chamber exceeds the predetermined value (i.e., pump discharge pressure is high), the operation of the second pump is stopped and only the first pump is operated. Accordingly, a pump discharge volume is changed between cases where the pump discharge pressure is high and low.

In the same way as the piston pump in the Reference 1, according to the piston pumps disclosed in the References 2 and 3, respectively, the operation of the second pump is stopped when the pressure in the pump chamber exceeds a predetermined value though structures of the piston pumps in the References 1, 2, and 3 are slightly different from one another.

The piston pump disclosed in each of the References 1, 2, and 3 can increase the pump discharge volume at a time of low pump discharge pressure as compared to the pump discharge volume at a time of high discharge pressure without an increase of capacity of a motor that drives the piston pump (i.e., piston driving motor). Accordingly, in the ABS control, for example, a fluid stored in a reservoir (i.e., brake fluid) can be rapidly pumped. In addition, in the ESC control, the TRC control, and the like, a responsiveness of pressurization of the wheel cylinder pressure can be enhanced to thereby improve each control performance.

As mentioned above, the piston pump disclosed in each of the References 1, 2, and 3 can increase the pump discharge volume at a time of low pump discharge pressure as compared to the pump discharge volume at a time of high discharge pressure without an increase of capacity of the piston driving motor to thereby enhance responsiveness of the ABS control, the ESC control, and the like. However, the pressure in the pump chamber upon the change of the pump discharge volume may not be stable.

That is, the pressure in the pump chamber when the pump discharge volume is changed (i.e., the operation of the second pump is stopped) is determined on the basis of a sum of a load of the spring that biases the body and a sliding resistance of the body. In this case, the sliding resistance of the body is variable depending on a size of the sliding portion, temperature, and the like. Accordingly, the pressure in the pump chamber when the pump discharge volume is changed varies due to the variation in the sliding resistance of the body, which may negatively affect the stability of the hydraulic control.

A need thus exists for a piston pump which is not susceptible to the drawback mentioned above.

SUMMARY OF THE INVENTION

According to an aspect of the present invention, a piston pump includes a first piston pump including a first piston and a first pump chamber, a drive apparatus for driving the first piston pump, a second piston pump including a second piston and a second pump chamber having an annular shape to surround the fast piston, the second piston operating to follow an operation of the first piston, a pressure release passage formed in communication with the second pump chamber, and a relief valve provided at the pressure release passage and defining all upper limit discharge pressure of the second piston pump. When a discharge pressure of the second piston pump is equal to or smaller than the upper limit discharge pressure, a discharge fluid of the second piston pump is added to a discharge fluid of the first piston pump so as to flow into an outlet port. In addition, when the discharge pressure of the second piston pump exceeds the upper limit discharge pressure, the discharge fluid of the second piston pump is released to the pressure release passage through the relief valve and the discharge fluid of the first piston pump only flows to the outlet port.

According to an another aspect of the present invention, a piston pump includes a first piston pump including a first pump chamber defined by a first cylinder and a first piston of which the end portion faces the first pump chambers a drive apparatus for driving the first piston pump, a second piston pump including a second pump chamber defined by a second cylinder and a second piston of which an end portion faces the second pump chamber, the second pump chamber having an annular shape and formed at an outer peripheral side of the first piston, the second piston having an annular shape and arranged at the outer peripheral side of the first piston, the second piston performing a reciprocating movement by following an operation of the first piston, a pressure release valve formed in connection with the second pump chamber, a relief valve provided at the pressure release passage and defining an upper limit discharge pressure of the second piston pump, and the first piston pump and the second piston pump including inlet valves respectively, an exit of the second pump chamber being connected to the first pump chamber via the inlet valve of the first piston pump, the pressure release passage being connected to the exit of the second pump chamber.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
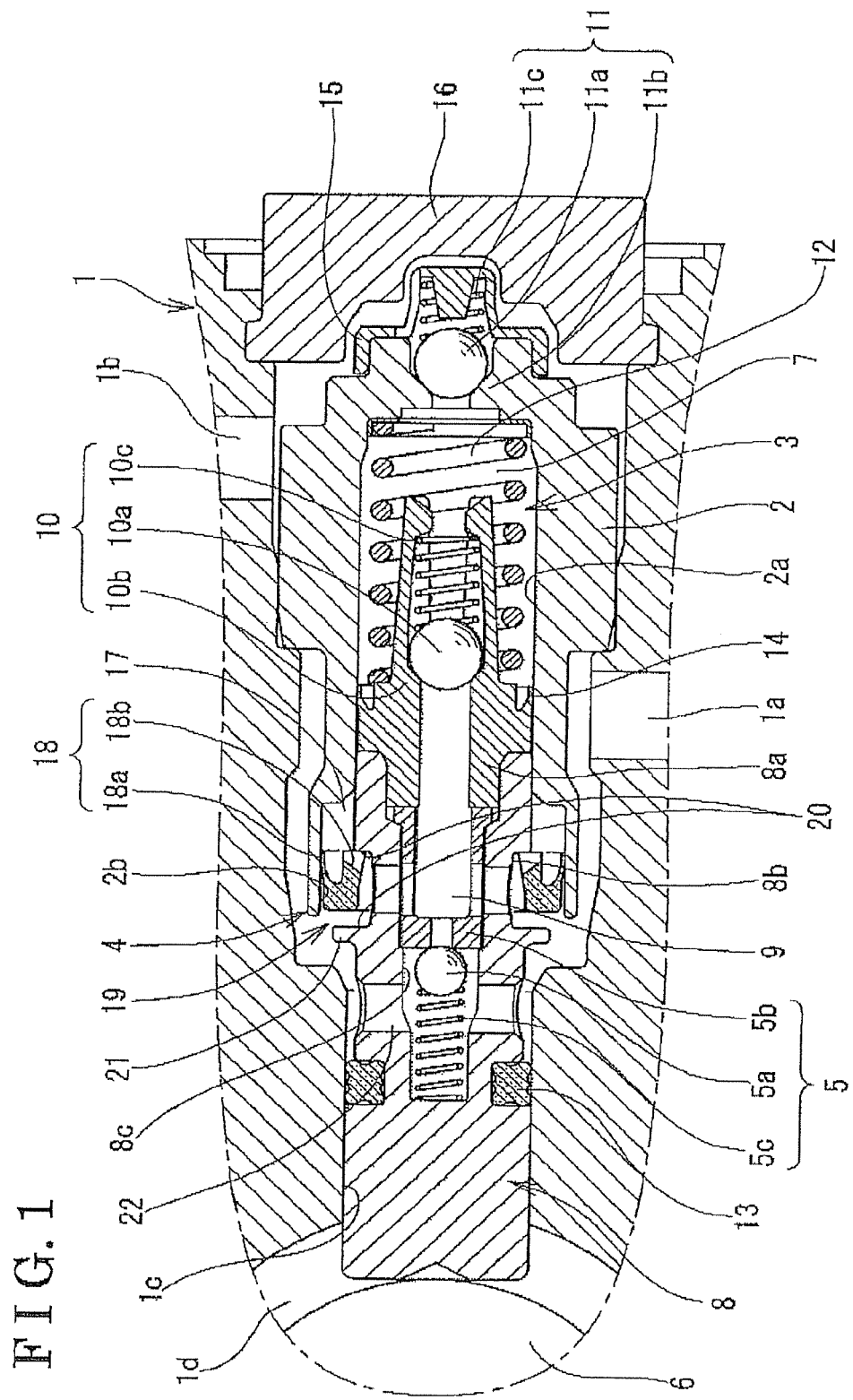
FIG. 1 is a cross-sectional view of a main portion of a piston pump according to a first embodiment of the present invention.

Embodiments of the present invention will be explained with reference to FIGS. 1 to 10. A piston pump according to a first embodiment illustrated in FIG. 1 includes a cylinder member 2, a first piston pump 3, a second piston pump 4, a relief valve 5, and an eccentric cam 6, all of which are accommodated with a pump housing 1 that includes an inlet port 1a and an outlet port 1b. The piston pump also includes an electric motor (not shown) for driving the eccentric cam 6. The electric motor and the eccentric cam 6 collectively constitute a drive apparatus by means of which the first and second piston pumps 3 and 4 are driven.

The cylinder member 2 includes a first cylinder 2a and a second cylinder 2b that has a larger diameter than that of the first cylinder 2a. Then, two pump chambers to be explained later are defined by the first and second cylinders 2a and 2b, respectively. As illustrated in FIG. 1, the first and second cylinders 2a and 2b are integrally formed at the cylinder member 2 to thereby achieve an easy processing and ensure concentricity.

The first piston pump 3 includes a first pump chamber 7, a first piston 8, an inlet valve 10, an outlet valve 11, and a return spring 12. The first pump chamber 7 is defined by the first cylinder 2a. Axial one end and the other end of the first piston 8 are inserted into the first cylinder 2a and a guide bore 1c formed at the pump housing 1, respectively so that the one end of the first piston 8 faces the first pump chamber 7. The inlet valve 10 is arranged at an entrance side (i.e., close to an inlet passage 9) of the first pump chamber 7 while the outlet valve 11 is arranged at an exit side of the first pump chamber 7. The return spring 12 pushes the first piston 8 back to a bottom dead center illustrated in FIG. 1 from a top dead center illustrated in FIG. 2 to which the first piston 8 has been pressed to move by the eccentric cam 6. The other end of the first piston 8 is inserted into an air chamber 1d formed at the pump housing 1 while the first piston 8 and the guide bore 1c are sealed by a seal member 13. The other end of the first piston 8 makes contact with an outer periphery of the eccentric cam 6 arranged within the air chamber 1d. Since the first piston 9 compresses a fluid within the first pump chamber 7 when moving in a rightward direction in FIG. 1, a right end side of each component in addition to the first piston 8 in FIG. 1 is defined as a front end and a left end side is defined as a rear end. As for the other embodiments, a direction of the piston pump will be explained in the same way as the first embodiment.

The inlet valve 10 of the first piston pump 3 is a known valve that includes a spherical valve body 10a, a valve seat 10b with which and from which the valve body 10a makes contact or separates, and a spring 10c that biases the valve body 10a in a closed direction so that the valve body 10a is pressed against the valve seat 10b. A retainer 8a made of resin and including the valve seat 10b and a seal portion (i.e., lip seal in FIG. 1) 14 for sealing an outer periphery is arranged at the front-end side of the first piston 8. The inlet valve 10 is arranged inside of the retainer 8a.

The outlet valve 11 of the first piston pump 3 is also a known valve that includes a spherical valve body 11a, a valve seat 11b with which and from which the valve body 11a makes contact or separates, and a spring 11c that biases the valve body 11a in a closed direction so that the valve body 11a is pressed against the valve seat 11b. The spring 11c is supported by a retainer 15 that is mounted to the cylinder member 2 by press fitting, for example. According to such structure, the outlet valve 11 is assembled onto the cylinder member 2 beforehand so that the assembly performance of the outlet valve 11 is enhanced. However, alternatively, the retainer 15 may be omitted and a reaction force of the spring 11c may be received by a cap 16 provided for covering and closing an assembly hole of the pump housing 1.

The second piston pump 4 includes a second pump chamber 17 defined by the second cylinder 2b, a second piston 18 of which front end faces the second pump chamber 17, an inlet valve 19 for opening and closing an entrance of the second pump chamber 17, and an outlet valve to be explained later.

The second piston 18 is constituted by a cup seal made by flexible resin or rubber that can be molded and is low in cost. The second piston 18 is assembled within an annular groove 8b formed at an outer periphery of the first piston 8 in such a way that the second piston 18 is axially movable relative to the first piston 8. A seal portion 18a formed at an outer periphery of the second piston 18 makes closely contact with an inner peripheral surface of the second cylinder 2b. Then, a gap is formed as a fluid passage between the inner peripheral surface of the second cylinder 2b and an outer peripheral surface of the first piston 8. The second piston 18 performs a reciprocating movement by following a movement of the first piston 8.

Stoppers 20 are formed, facing each other, at the outer periphery of the first piston 8 so as to restrict a relative movement of the second piston 18 to the first piston 8 in the axial direction to be equal to or less than a stroke of the first piston 8. In FIG. 1, the stopper 20 on the right side is formed by one side surface of the annular groove 8*b*. The stopper 20 on the left side in FIG. 1 is formed by the other side surface of the annular groove 8*b* and a flange 21 formed at the outer periphery of the first piston 8. The pressing of the second piston 18 is performed by the flange 21 in a compression process of the piston pump. Thus, the second piston 18 is securely pressed to thereby enhance the operation stability of the second piston pump 4. The distance that the second piston 18 moves together with the first piston 8 (i.e., stroke) is obtained by subtracting the relative movement of the second piston 18 to the first piston 8 from the stroke of the first piston 8.

A valve portion of the inlet valve 19 of the second piston pump 4 is constituted by respective portions of the first piston 8 and the second piston 18. Specifically, the valve portion is constituted by an end surface of the flange 21 formed at the outer periphery of the first piston 8 and a rear end of the second piston 18 (i.e., left end in FIG. 1) positioned away from the second pump chamber 17. The second piston 18 is inserted into the second cylinder 2*b*. Then, a sliding resistance between the second piston 18 and the second cylinder 2*b* is specified to be larger than that between the second piston 18 and the fist piston 8. The relative movement between the first piston 8 and the second piston 18 causes the flange 21 to make contact with or separates from the second piston 18 to thereby open or close the valve portion of the inlet valve 19. Thus, the inlet valve 19 is operated with a zero valve opening pressure, which leads to an excellent responsiveness of the valve opening and a wide inlet passage. According to the piston pump of the first embodiment, a gap is formed between the inner peripheral surface of the second piston 18 and the outer peripheral surface of the first piston 8 and therefore the sliding resistance therebetween is specified to be zero. Consequently, the sliding resistance between the second piston 18 and the second cylinder 2*b* is not required to be significantly large. Loss of power caused by the sliding resistance may be minimized. In addition, with the above structure of the inlet valve 19, the structure of the second piston pump 4 is simplified to thereby expect reduction in cost, downsizing of the piston pump, and the like.

Figure 3A:
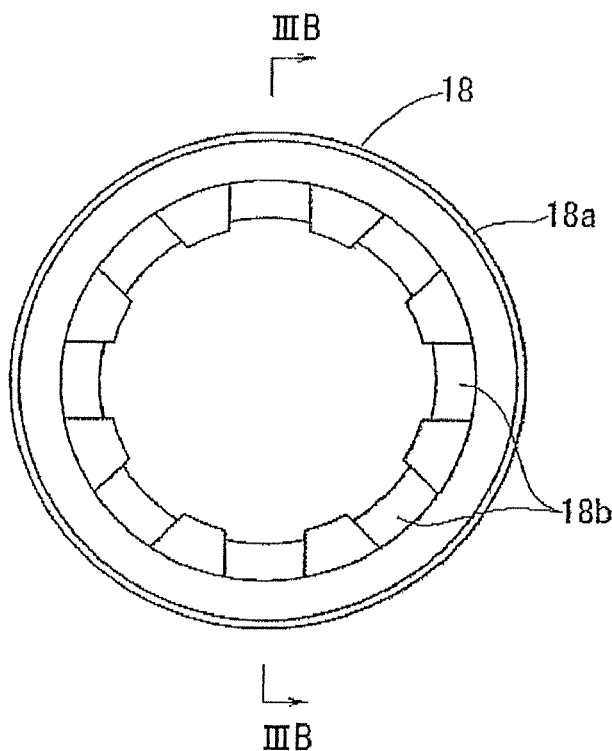
FIG. 3A is an end view of a second piston of the piston pump illustrated in FIG. 1.
Figure 3B:
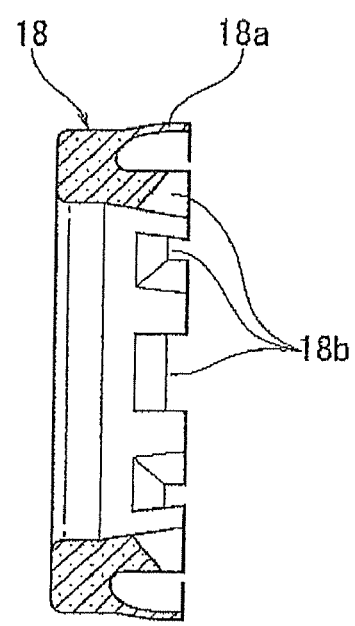
FIG. 3B is a cross-sectional view taken along the line IIIB-IIIB in FIG. 3A.

As illustrated in FIGS. 3A and 3B, multiple slits 18*b* are formed at the inner periphery of the second piston 18 at even intervals in the peripheral direction. Then, by means of the slits 18*b*, an exit of the second pump chamber 17 is in communication with the inlet passage 9 connected to the first pump chamber 7. The slits 18*b* can be formed by a die when the second piston 18 is molded. Thus, a communication passage between the second pump chamber 17 and the inlet passage 9 can be simply formed to thereby expect a simpler structure, a productivity improvement, reduction in cost, and the like, of the piston pump.

The fluid discharged from the second piston pump 4 (i.e., discharge fluid) is sent to the first pump chamber 7 via the inlet valve 10 of the first piston pump 3 and is then discharged from the outlet port 1*b* via the outlet valve 11 of the first piston pump 3. According to such structure, the outlet valve 11 of the first piston pump 3 is also used as the outlet valve of the second piston pump 4 to thereby achieve reductions of machining man hours and cost, a downsizing of the piston pump, and the like.

Although the outlet valve 11 of the first piston pump 3 is desirably used as the outlet valve of the second piston pump 4, it is not necessary. A passage for communicating the second pump chamber 17 to the outlet port 1*b* may be formed at the cylinder member 2. Then, an outlet valve having the same structure as that of the outlet valve 11 may be arranged at the passage through which the fluid discharged from the second pump chamber 17 is sent to the outlet port 1*b* without passing through the first pump chamber 7.

The relief valve 5 is provided for releasing the fluid discharged from the second pump chamber 17 when a pump discharge pressure of the second piston pump 4 exceeds an upper limit discharge pressure. According to the piston pump of the present embodiment, the relief valve 5 is arranged inside of the first piston 8. A pressure release passage 22 connected to the second pump chamber 17 is also provided inside of the first piston 8. Then, the relief valve 5 is arranged at the pressure release passage 22. The relief valve 5 illustrated in FIG. 1 includes a valve body 5*a*, a valve seat 5*b*, and a spring 5*c* for pressing the valve body 5*a* against the valve seat 5*b*. A valve portion of the relief valve 5 is formed between the valve body 5*a* and the valve seat 5*b*. When the valve portion is opened, the fluid is released through a clearance defined between a bore 8*c* formed inside of the first piston 8 and an outer periphery of the valve body 5*a*. Accordingly, the pressure release passage 22 and the relief valve 5 arranged inside of the first piston 8 achieve efficiency for space utilization and therefore further downsizing of the piston pump.

The pressure release passage 22 is constituted in such a way that the fluid released through the pressure release passage 22 flows back to an entrance side of the second pump chamber 17 as illustrated in FIG. 1. Such structure is desirable since the pressure release passage 22 is prevented from being complicated or elongated. However, alternatively, an exhaust port (not shown) connected to a reservoir (not shown) serving as a brake fluid supply source may be provided at the pump housing 1. Then, the pressure release passage 22 may be connected to the exhaust port via a clearance formed around the first piston 8.

Figure 2:
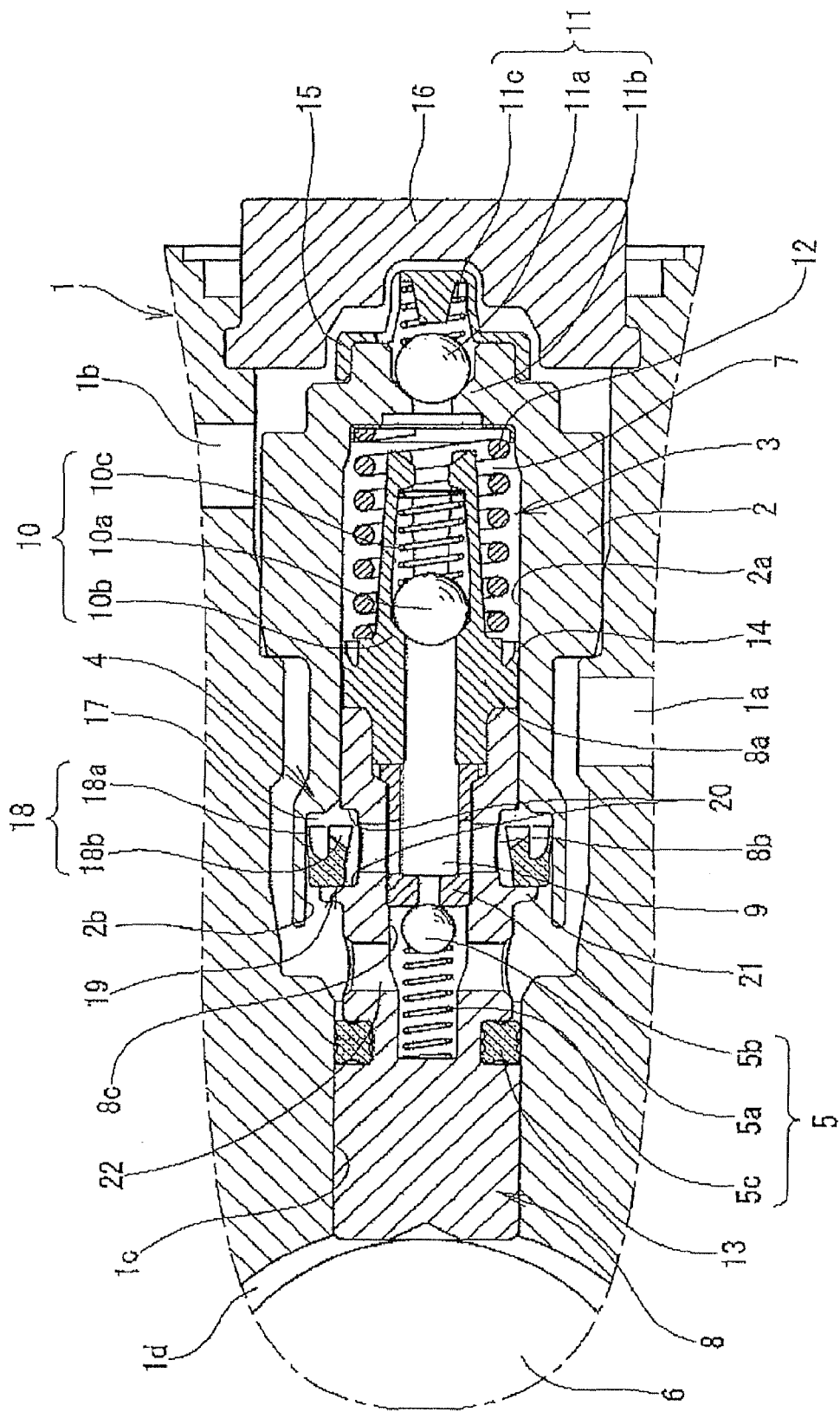
FIG. 2 is a cross-sectional view of the piston pump illustrated in FIG. 1 in a state where a piston moves to a top dead center.

According to the thus-structured piston pumps the first piston 8 is driven by the eccentric cam 6 to move from the bottom dead center illustrated in FIG. 1 to the top dead center illustrated in FIG. 2. Once the first piston 8 reaches the top dead center, the first piston 8 is pushed back to the bottom dead center by means of the return spring 12. Such operation is repeatedly performed. The second piston 18 follows the aforementioned operation of the first piston 8, so that the discharge and suction of the fluid is performed by means of the first piston pump 3 and the second piston pump 4. In cases where the pump discharge pressure of the second piston pump 4 is lower than the upper limit discharge pressure defined by the relief valve 5, the fluid discharged from the second piston pump 4 is added to the fluid discharged from the first piston pump 3 to flow into the outlet port 1*b*. When the fluid discharged from the second pump chamber 17 flows into the outlet port 1*b*, the inlet valve 10 of the first piston pump 3 is opened so that the fluid can pass through the open inlet valve 10. At this time, the inlet valve 19 of the second piston pump 4 is closed so as to block a communication between the inlet port 1*a* and the inlet passage 9. The fast piston pump 3 is actually operated, accordingly.

On the other hand, in cases where the discharge pressure of the second piston pump 4 exceeds the upper limit discharge pressure defined by the relief valve 5, the relief valve 5 is opened. Then, the fluid discharged from the second piston pump 4 is released through the relief valve 5 in the open state. As a result, the fluid discharged only from the first piston pump 3 flows into the outlet port 1*b*. The pressure in the second pump chamber 17 at that time is equal to the upper limit discharge pressure defined by the relief valve 5. An effect by the sliding resistance of the second piston 18 is eliminated and therefore the variation in the pressure of the second pump chamber 17, specifically and eventually, the variation in the discharge pressure of the first piston pump 3, upon a change of a pump discharge volume is prevented.

Figure 4:
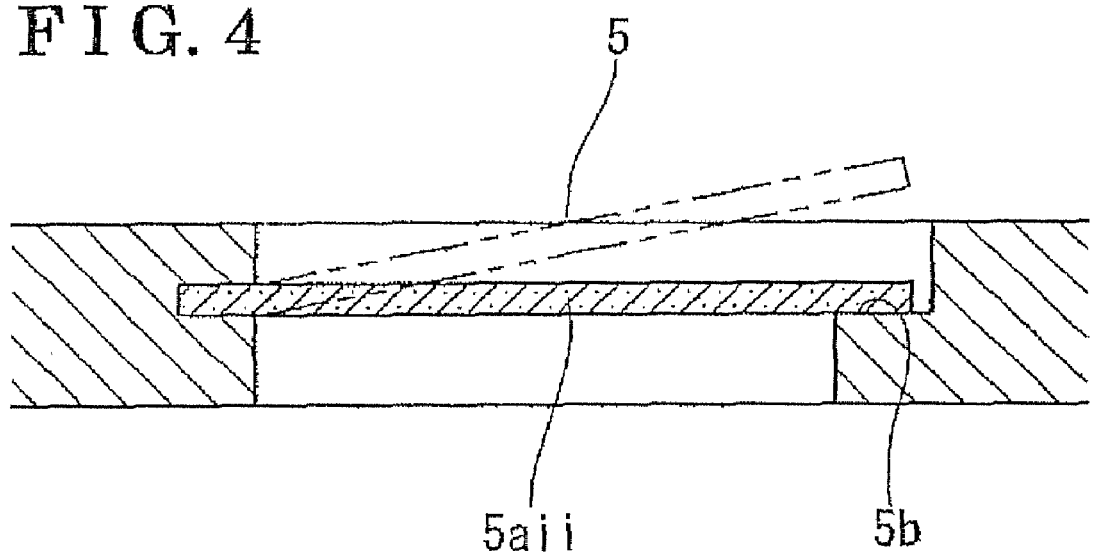
FIG. 4 is a cross-sectional view of a relief valve according to another example of the first embodiment of the present invention.

The spherical valve body 5a of the relief valve 5 illustrated in FIG. 1 may be replaced by a poppet type valve body. In addition, as illustrated in FIG. 4, the relief valve 5 may include a flat-shaped valve body 5aii elastically deformed by means of a difference in pressures applied to respective faces of the valve body 5aii so that the valve body 5aii separates from a seat surface of the valve seat 5b and opens. Such relief valve may be arranged at a passage formed at the cylinder member 2 to extend from the second pump chamber 17 to the outer periphery of the cylinder member 2.

Figure 5:
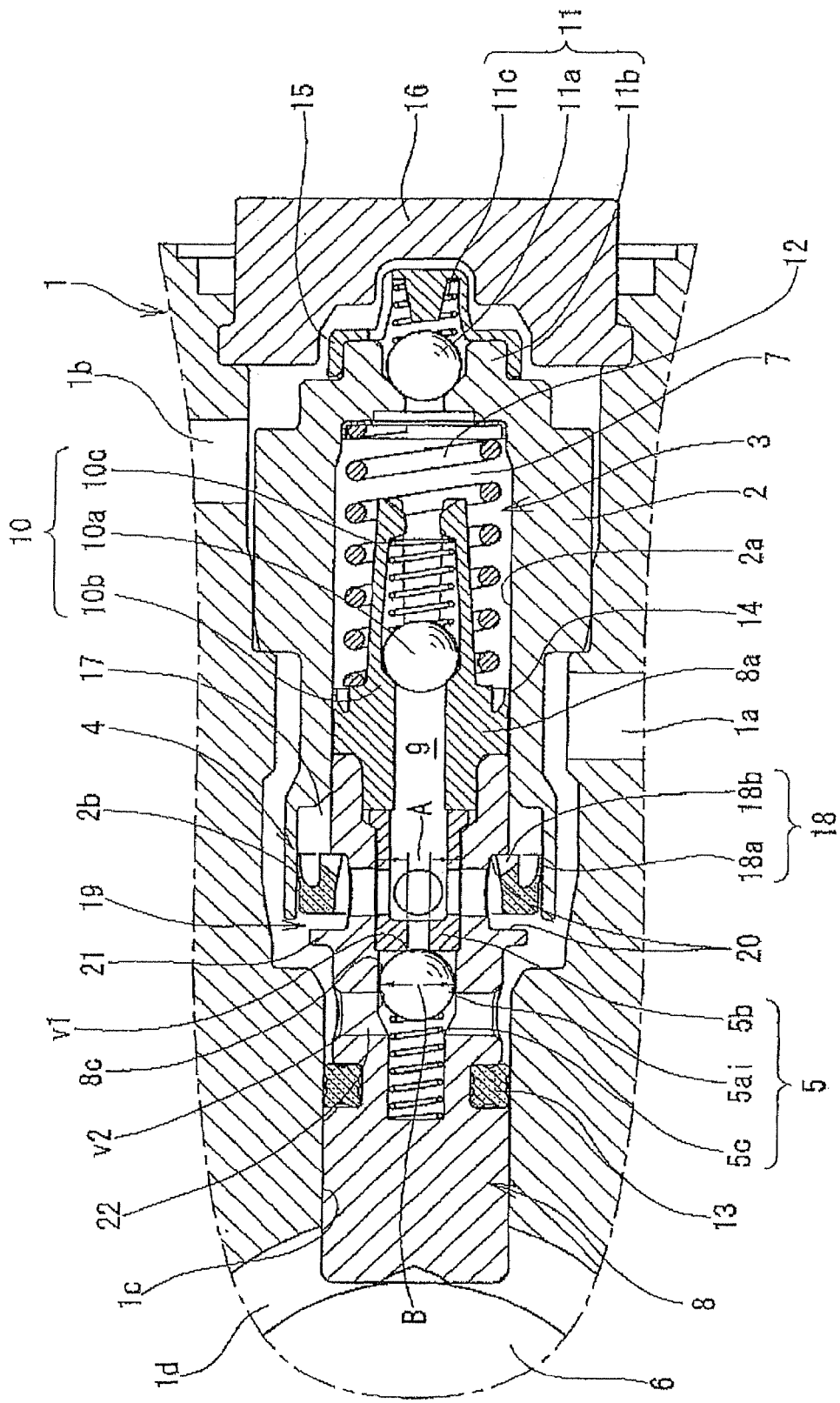
FIG. 5 is a cross-sectional view of a main portion of a piston pump according to a second embodiment of the present invention.
Figure 6:
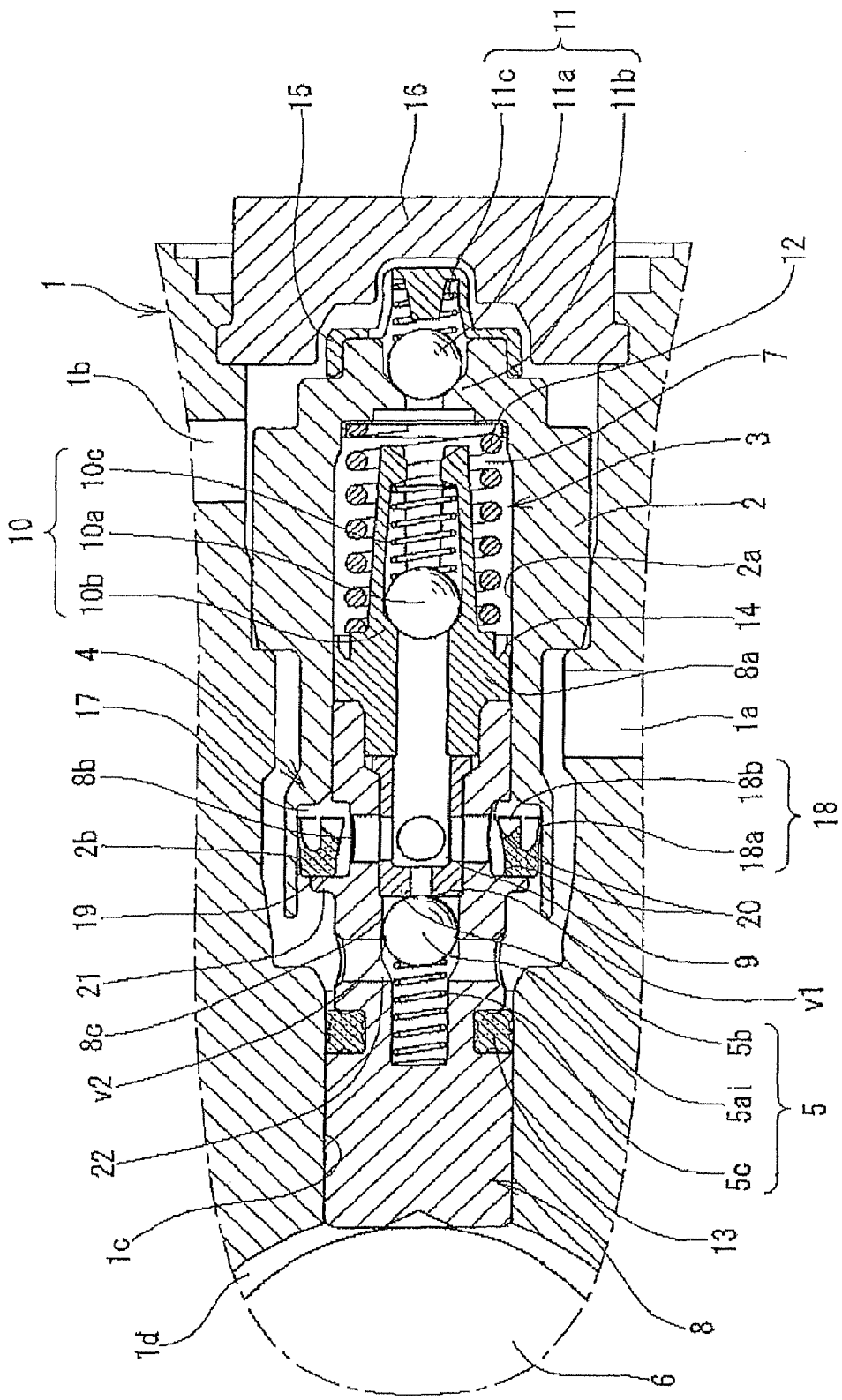
FIG. 6 is a cross-sectional view of the piston pump illustrated in FIG. 5 in a state where a piston moves to a top dead center.

FIGS. 5 and 6 illustrate a second embodiment of the piston pump. The piston pump according to the second embodiment includes a more desirable relief valve. The relief valve 5 illustrated in FIG. 5 includes a spherical valve body 5ai having a larger diameter than that of the valve body in FIG. 1 according to the first embodiment, the valve seat 5b with which and from which the valve body 11a makes contact or separates, and the spring 5c that biases the valve body 5ai in a closed direction so that the valve body 5ai is pressed against the valve seat 5b. The valve body 5ai includes a first pressure-receiving surface having an area obtained by a formula of $\pi*(A/2)^2$, and a second pressure-receiving surface having an area obtained by a formula of $\pi*(B/2)^2$. The area of the second pressure-receiving surface is larger than the area of the first pressure-receiving surface. A first valve portion v1 is constituted by the valve body 5ai and the valve seat 5b. A second valve portion v2 is constituted by the valve body 5ai and the bore 8c into which the valve body 5ai is inserted. The second valve portion v2 is formed in such a way that the valve body 5ai is sufficiently inserted into the bore 8c formed inside of the first piston 8, and that a clearance formed between an outer periphery of the valve body 5ai and an inner surface of the bore 8c is made small.

According to the thus-structured relief valve 5 illustrated in FIG. 5, the first valve portion v1 and the second valve portion v2 are each maintained in a closed state while the discharge pressure of the second piston pump 4 is equal to or smaller than the upper limit discharge pressure. During that time, the valve body 5ai receives the discharge pressure of the second piston pump 4 at the first receiving surface.

On the other hand, in cases where a fluid pressure applied to the first pressure receiving surface exceeds the upper limit discharge pressure of the second piston pump 4, the biasing force of the spring 5c fails to overcome a thrust force caused by the fluid pressure. Then, the valve body 5ai separates from the valve seat 5b to thereby open the first valve portion v1. Accordingly, the fluid passing through the first valve portion v1 is applied to the second pressure receiving surface of the valve body 5ai to thereby open the second valve portion v2. Since the area of the second pressure receiving surface is larger than that of the first pressure receiving surface, the second valve portion v2 is opened with the lower pressure than that for opening the first valve portion v1. In the following, the pressure for opening the first valve portion v1 will be referred to as a valve-opening pressure P1, and the pressure for opening the second valve portion v2 will be referred to as a valve-opening retention pressure P2. When the second valve portion v2 is open, an amount of lift of the valve body 5ai increases to thereby increase an opening degree of the first valve portion v1. When the first valve portion v1 is fully opened and thus the fluid sufficiently passes through the first valve portion v1, a load of the motor that drives the pump (i.e., pump driving motor) while the discharge fluid from the second pump chamber 17 is released is small and an energy loss in association with the operation of the relief valve 5 is made small. The aforementioned valve-opening retention pressure P2 can be made extremely smaller than the valve-opening pressure P1. For example, P2 may be approximately 0.36 MPa when P1 is equal to 5 MPa. In this case, the valve-opening retention pressure P2 is approximately 7% of the valve-opening pressure P1 to thereby minimize increases of the motor load and the energy consumption to an extent that they can be ignored.

Figure 7:
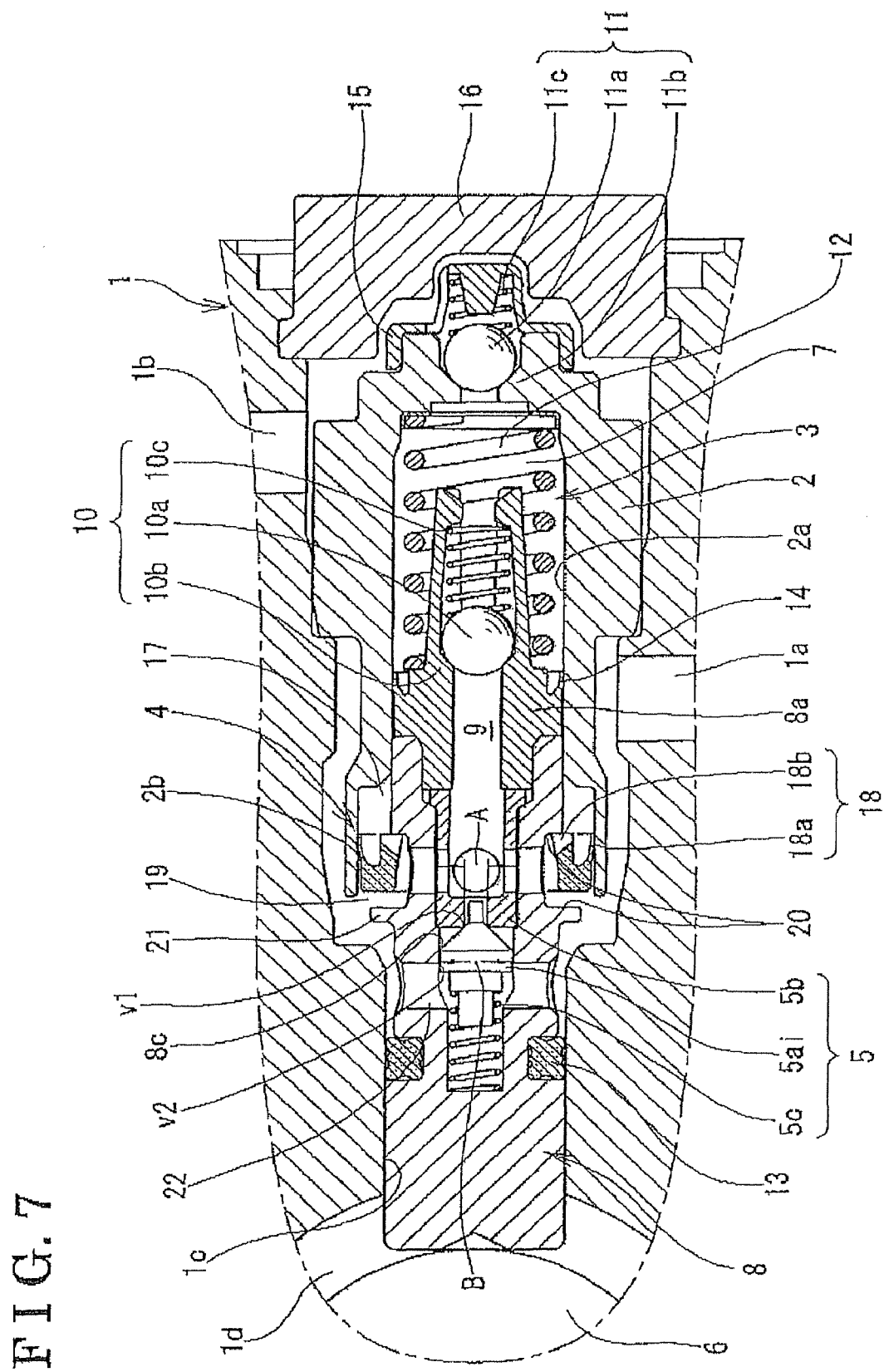
FIG. 7 is a cross-sectional view of a main portion of a piston pump according to a third embodiment of the present invention.
Figure 8:
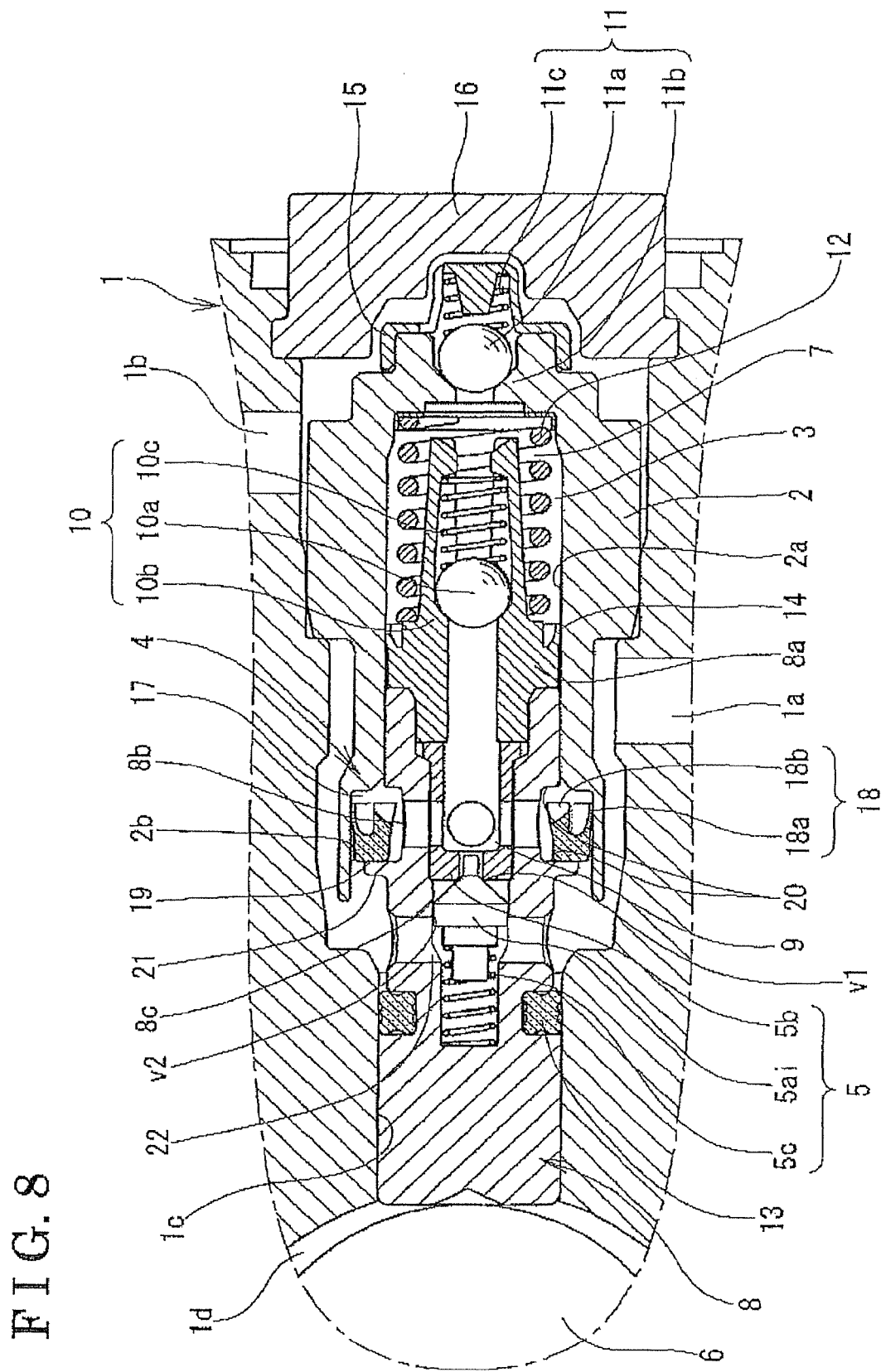
FIG. 8 is a cross-sectional view of the piston pump illustrated in FIG. 7 in a state where a piston moves to a top dead center.

FIGS. 7 and 8 illustrate a third embodiment of the piston pump. The relief valve according to the third embodiment is different from that of the second embodiment. The relief valve 5 in FIG. 7 is achieved by replacing the spherical valve body 5ai of the relief valve in FIG. 5 by a poppet type valve body. The shapes of both the valve bodies are different from each other but functions are identical. Thus, same numerical numbers are assigned to the valve body in FIG. 7 as those in FIG. 5. The valve body 5ai of the relief valve 5 in FIG. 7 also includes the first pressure receiving portion and the second pressure receiving portion having the larger area than that of the first pressure receiving portion. The first valve portion v1 is constituted by the valve body 5ai and the valve seat 5b. The second valve portion v2 is constituted by the valve body 5ai and the bore 8c formed at the first piston 8. After the first valve portion v1 is opened, the second valve portion v2 is opened by the lower fluid pressure (i.e., valve-opening retention pressure P2) than the valve-opening pressure P1 of the first valve portion v1 so that the load of the pump driving motor is reduced. The poppet type valve body makes more close contact with the valve seat 5b than the spherical valve body. Thus, when focusing on the sealing performance of the pressure release passage 22, the poppet type valve body is desirably employed for the relief valve 5.

Figure 9:
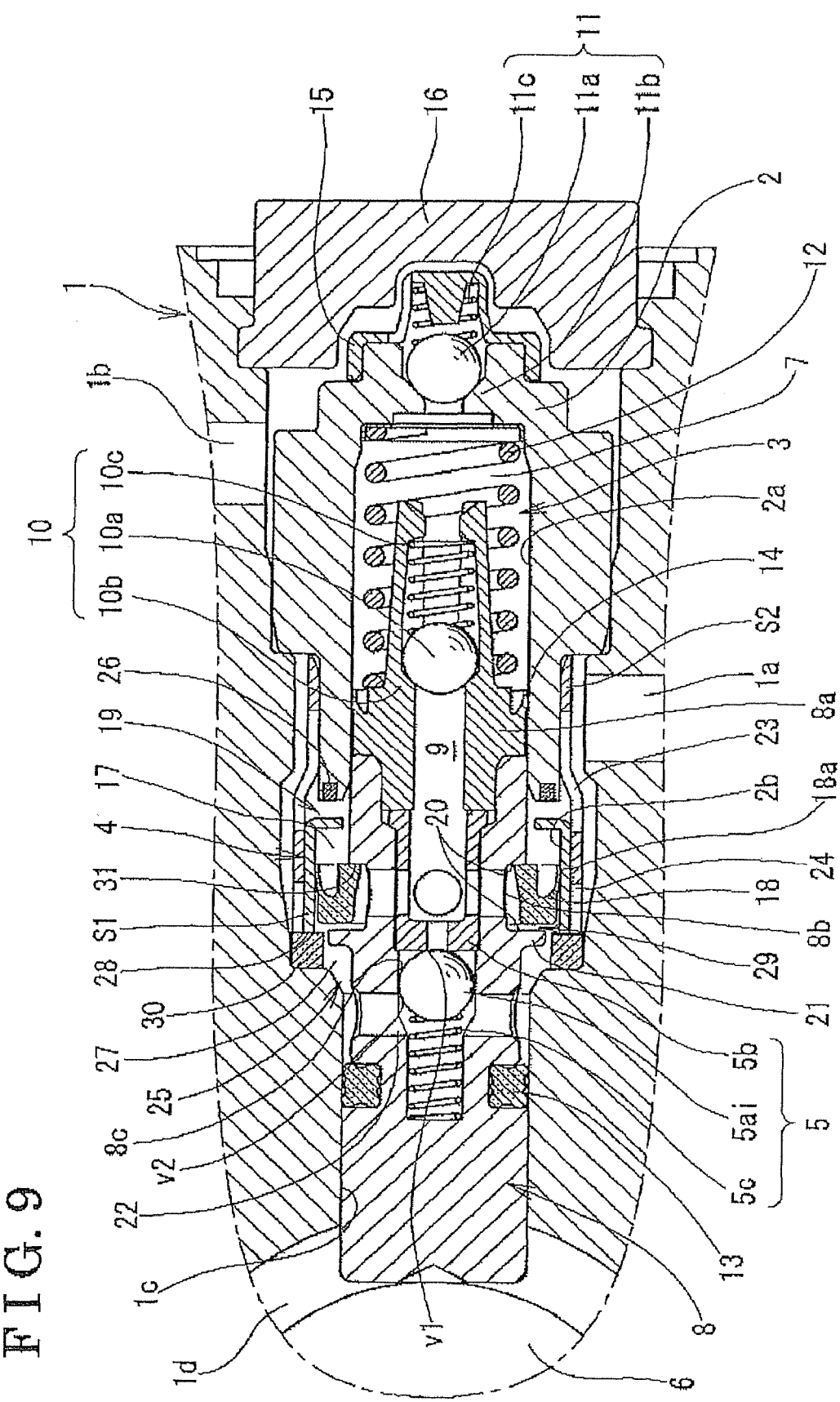
FIG. 9 is a cross-sectional view of a main portion of a piston pump according to a fourth embodiment of the present invention.
Figure 10:
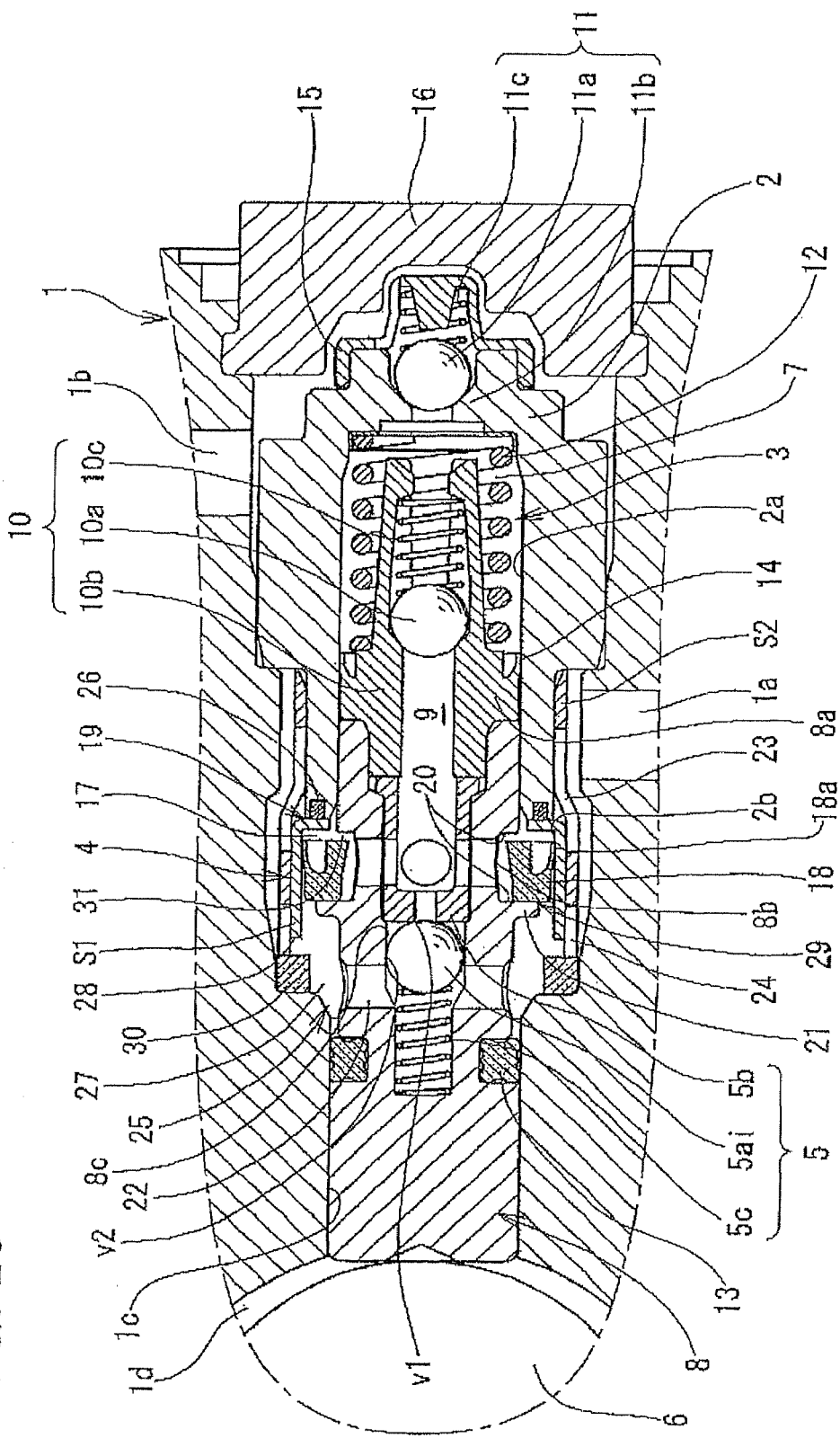
FIG. 10 is a cross-sectional view of the piston pump illustrated in FIG. 9 in a state where a piston moves to a top dead center.

FIGS. 9 and 10 illustrate a fourth embodiment of the piston pump. The piston pump according to the fourth embodiment is obtained by replacing the inlet valve 19 of the second embodiment by that illustrated in FIGS. 9 and 10. In addition, a feed pump 25 is provided for supplying the fluid to the first pump chamber 7 in a suction process of the piston pump in which the first piston 8 moves from the top dead center to the bottom dead center. In the followings, differences in FIGS. 9 and 10 from FIG. 5 will be explained.

As illustrated in FIG. 9, the second cylinder 2b is constituted by a fixed cylinder S2 retained at the cylinder member 2, and a movable cylinder S1 inserted into the inside of the fixed cylinder S2 in such a manner to be axially slidable thereto. The second piston 18 is inserted into the movable cylinder S1 so as to be axially slidable thereto. The sliding resistance between the second piston 18 and the movable cylinder S1 is larger than that between the movable cylinder S1 and the fixed cylinder S2. A valve portion of the inlet valve 19 is formed between the cylinder member 2 and a front end (i.e., right end side in FIG. 9) of the movable cylinder S1. The fixed cylinder S2 serves as a movement guide of the movable cylinder S1 and as a desirable element for improving reliability of the piston pump (however, not necessary element). The fixed cylinder S2 includes a cutout portion 23 by means of which the second pump chamber 17 is in communication with the inlet port 1a of the pump housing 1 via the valve portion of the inlet valve 19. The movable cylinder S1 moves together with the second piston 18 to perform the reciprocating movement in the axial direction to thereby cause the valve portion of the inlet valve 19 to open or close. The valve portion of the inlet valve 19 is opened or closed while the movable cylinder S1 makes contact with or separates from a seal member 26. In this case, however, the seal member 26 is not necessary provided. A material of the movable cylinder S1 may be either metal or resin. In cases where the metallic movable cylinder S1 is used, the valve portion of the inlet valve 19 may be closed through a contact of two metallic members, which is permissible.

The feed pump 25, which is realized through the use of the second piston 18, includes the second piston 18, a third pump chamber 27, an inlet valve 28, and an outlet valve 29. The third pump chamber 27 is provided in the rear of the second piston 18 (i.e., an opposite side of the second pump chamber 17 relative to the second piston 18). The inlet valve 28 opens or closes an entrance of the third pump chamber 27. The outlet valve 29 opens or closes an exit of the third pump chamber 27. A case for accommodating the first and second pistons 8 and 18 (i.e., the case as illustrated in FIG. 9 is constituted by the pump housing 1, the cylinder member 2, and the cap 16) and the movable cylinder S1 constitute the inlet valve 19 provided at the entrance side of the second pump chamber 17 and the inlet valve 28 provided at the entrance side of the third pump chamber 27. The inlet valves 19 and 28 are alternately opened or closed, i.e., the inlet valve 19 is opened when the inlet valve 28 is closed, and the inlet valve 19 is closed when the inlet valve 28 is opened, by means of the reciprocating movement of the movable cylinder S1. Further, the first and second pistons 8 and 18 constitute a valve portion 31 provided at an exit side of the second pump chamber 17 and the outlet valve 29 provided at an exit side of the third pump chamber 27. The valve portion 31 and the outlet valve 29 are alternately opened or closed, i.e., the valve portion 31 is opened when the outlet valve 29 is closed, and the valve portion 31 is closed when the outlet valve 29 is opened, by means of the axial relative movement of the first and second pistons 8 and 18.

The inlet valve 28 in FIG. 9 is formed between a seal member 30 formed inside of the pump housing 1 and a rear end of the movable cylinder S1. In this case, however, the seal member 30 is not necessary. That is, the inlet valve 28 may be formed between the movable cylinder S1 and the pump housing 1. The fixed cylinder S2 includes a cutout portion 24 (that may be a hole, instead) by means of which the third pump chamber 27 is in communication with the inlet port 1a when the inlet valve 28 is open.

The valve portion of the outlet valve 29 is constituted by the end surface of the flange 21 formed at the first piston 8 and the rear end of the second piston 18 (i.e., left end in FIG. 1) positioned away from the second pump chamber 17, as in the same way as the inlet valve 19 according to the first to third embodiments. A stroke of the outlet valve 29 for opening and closing (i.e., relative movement of the first and second pistons 8 and 18) according to the fourth embodiment is small as compared to that of the outlet valve 29 according to the first to third embodiments, which is a different point therefrom.

Further, according to the fourth embodiment, the second piston 18 is not formed with the slits 18b that are provided at the second piston 18 in FIGS. 1, 5, and 7 according to the first to third embodiments. The valve portion 31 is formed between the second piston 18 and the first piston 8. The valve portion 31 is provided for opening and closing the exit of the second pump chamber 17. The opening and closing operation of the valve portion 31 is performed in an opposite manner as that of the outlet valve 29, i.e., the valve portion 31 is opened when the outlet valve 29 is closed, and the valve portion 31 is closed when the outlet valve 29 is opened.

According to the piston pump of the fourth embodiment illustrated in FIGS. 9 and 10, the stroke of the second piston 18 is obtained by subtracting the stroke of the movable cylinder S1 and the relative movement of the first and second pistons 8 and 18 (i.e., an opening and closing stroke of each of the outlet valve 29 and the valve portion 31) from the stroke of the first piston 8. The opening and closing stroke of each of the outlet valve 29 and the valve portion 31 can be small. Since the pushing force is applied to the fluid fed to the inlet passage 9 from the second pump chamber 17 and the third pump chamber 27, even when the opening and closing stroke of each of the outlet valve 29 and the valve portion 31 is around 0.2 mm, for example, an excellent pumping performance is ensured. According to the piston pump of the present embodiment, the opening and closing stroke of each of the outlet valve 29 and the valve portion 31 is specified to be 0.2 mm. In addition, the opening and closing stroke of the movable cylinder S1 is specified to be 0.5 mm, and the substantial stroke of the second piston 18 is specified to be 1.7 mm. These numerical numbers are only examples.

According to the thus-structured piston pump of the fourth embodiment, in a discharge process of the first and second piston pumps 3 and 4 in which the first piston 8 moves from the bottom dead center illustrated in FIG. 9 to the top dead center illustrated in FIG. 10, the outlet valve 29 is first closed (at this time, the valve portion 31 is opened). Next, the movable cylinder S1 is forcedly pushed to move in a rightward direction in FIG. 9 by means of the second piston 18 that starts to follow the movement of the first piston 8 to thereby open the inlet valve 28. In such state, the first and second pistons 8 and 18 further move in the rightward direction in FIG. 9 to thereby start the suction of the fluid to the third pump chamber 27. Then, the inlet valve 19 is closed and the further continuous movement of the first and second pistons 8 and 18 causes the fluid within the first and second pump chambers 7 and 17 to be compressed and fed to the outlet port 1b as illustrated in FIG. 10.

In the suction process of the first and second piston pumps 3 and 4 in witch the first piston 8 returns from the top dead center illustrated in FIG. 10 to the bottom dead center illustrated in FIG. 9, the inlet valve 10 is first opened. While the fluid is suctioned to the first pump chamber 7, the first piston 8 is shifted to a leftward direction in FIG. 10 to thereby close the first valve portion 31 (at this time, the outlet valve 29 is opened). Next, the second piston 18 starts to follow the movement of the first piston 8 and thereafter the movable cylinder S1 moves in the leftward direction in FIG. 10 in association with the movement of the second piston 18 to thereby open the inlet valve 19. As a result, the fluid is also suctioned to the second pump chamber 17.

Further, at this time, the feed pump 25 is operated to pressurize the fluid within the third pump chamber 27 by the second piston 18. The pressurized fluid is forcedly sent to the first pump chamber 7 through the valve portion of the outlet valve 29 in the open state. Due to this assist operation, the suction performance of the fluid to the first pump chamber 7 is improved to thereby avoid decrease in discharge efficiency of the piston pump resulting from fluidity deterioration of the fluid.

The suction of the fluid to the second pump chamber 17 is relatively smooth even with the high viscosity of the fluid caused by a low ambient temperature, and the like, since the inlet valve 19 is forcedly opened. On the other hand, the suction of the fluid to the first pump chamber 7 is performed through the inlet valve 10 that is biased by the spring 12 in the closed direction. Thus, the suction of the fluid to the first pump chamber 7 tends to be insufficient with the high viscosity of the fluid. As a result, the discharge volume of the fluid from the first piston pump 3 may decrease. In this case, the aforementioned assist operation performed by the feed pump 25 causes the fluid to be forcedly supplied to the first pump chamber 7. Therefore, the decrease in the pump discharge volume of the first pump chamber 7, i.e., the first piston pump 3, is prevented, so that the fluid stored in the reservoir is faster suctioned in the ABS control in the low temperature and the pressurization responsiveness of the wheel cylinder pressure is enhanced in the ESC control.

An operation performed when the discharge pressure of the second piston pump 4 exceeds the upper limit discharge pressure defined by the relief valve 5 according to the piston pump of the fourth embodiment will be explained below. In this case, the fluid discharged from the second piston pump 4 is released through the relief valve 5. Only the fluid discharged from the first piston pump 3 flows through the outlet port 1b. Since the relief valve 5 of the fourth embodiment has the same structure as that of the second embodiment, i.e., once the relief valve 5 is opened, the pressure for maintaining the relief valve 5 in the open state (valve-opening retention pressure P2) decreases, the increase in load of the pump driving motor in association with the increase of the discharge pressure of the second piston pump 4 can be minimized.

The fluid released through the relief valve 5 flows into the third pump chamber 27 to thereby cause the fluid to tend to be stored in the third pump chamber 27. Thus, as compared to a state before the discharge pressure of the second piston pump 4 exceeds the upper limit discharge pressure, the suction of the fluid to the third pump chamber 27 is more excellent. Consequently, an effect for preventing the decrease in the fluid discharge volume of the first piston pump 3 is enhanced to thereby further improve the responsiveness of pressurization of the wheel cylinder pressure in the low temperature in the ESC control, for example.

According to the aforementioned embodiments, the second piston pump 4 is not stopped and kept operating even when the discharge pressure thereof increases, which is different from the aforementioned References 1 to 3. In this case, however, when the discharge pressure of the second piston pump 4 exceeds the upper limit discharge pressure, the relief valve 5 is opened. Then, the fluid discharged from the second piston pump 4 is released via the relief valve 5 in the open state to the pressure release passage 22, i.e., not sent to the outlet port 1b, to thereby change the pump discharge volume. Accordingly, the pressure in the second pump chamber 17 is determined on the basis of the upper limit discharge pressure of the relief valve 5 arranged at the pressure release passage 22. The upper limit discharge pressure of the relief valve 5 is determined on the basis of the load of the spring 5c that biases the valve body 5a or 5ai in the closed direction. Thus, the pressure in the second pump chamber 17 is prevented from being influenced by a size of contact of the second piston 18 with the first piston 8, temperature, and the like, which leads to no variations in pressure in the second pump chamber 17, specifically and eventually, the pressure of the fluid discharged from the first piston pump 3 to the outlet port 1b, upon change of the pump discharge volume.

In cases where the discharge pressure of the second pump chamber 17 exceeds the upper limit discharge pressure of the relief valve 5, the fluid discharged only from the first piston pump 3 flows into the outlet port 1b. Thus, the ability to discharge a great amount of fluid at high pressure is not required, which prevents an increase in capacity of the pump driving motor.

Further, according to the piston pump disclosed in the aforementioned References 1 to 3, a cross-sectional area of the pump chamber (i.e., positive displacement chamber) is equal to a sum of a cross-sectional area of the piston and a cross-sectional area of the body. Thus, ill cases where the operation of the body is stopped, the fluid in the pump chamber is compressed by the piston having the smaller cross-sectional area than that of the whole pump chamber, which leads to an decrease in pump efficiency. On the other hand, according to the embodiments, a cross-sectional area of the first piston 8 and a cross-sectional area of the first pump chamber 7 are equal to each other. Thus, the decrease in pump efficiency when the pump discharge volume is changed may be avoided. In addition, the absence of decrease in pump efficiency enables a further downsizing of the piston pump with a smaller piston diameter.

The discharge fluid from the second piston pump 4 is sent to the first pump chamber 7 via the inlet valve 10 of the first piston pump 3 and flows into the outlet port 1b via the outlet valve 11 of the first piston pump 3.

In addition, the second piston 18 is arranged at the outer peripheral side of the first piston 8 so as to be axially movable relative thereto, the first piston 8 including the stopper 20 at an outer periphery for restricting an axial relative movement between the second piston 18 and the first piston 8 to be equal to or smaller than a stroke of the first piston 8, and a sliding resistance between the second piston 18 and the second cylinder 2b is specified to be larger than a sliding resistance between the second piston 18 and the first piston 8.

Further, the first piston 8 includes the flange 21 at the outer periphery for pressing the second piston 18 in the compression process.

Furthermore, the inlet valve 19 of the second piston pump 4 is opened and closed by means of the flange 21 to make contact with and separate from the second piston 18.

Furthermore, an inner peripheral surface of the second piston 18 and an outer peripheral surface of the first piston 8 forms a gap therebetween.

Furthermore, the second piston 18 includes the slit 18b at an liner peripheral side by means of which an exit of the second pump chamber 17 is in communication with the inlet passage 9 of the first piston pump 3.

Furthermore, the discharge fluid from the second pump chamber 17 that is released by passing through the pressure release passage 22 flows back to an entrance side of the second pump chamber 17.

Furthermore, the pressure release passage 22 and the relief valve 5 are arranged inside of the first piston 8.

Furthermore, the second piston 18 is formed by a cup seal made of resin or rubber.

Furthermore, the relief valve 5 includes the first valve portion v1 that is opened when the discharge pressure of the second piston pump 4 exceeds the upper limit discharge pressure and the second valve portion v2 that is opened at a lower pressure than a pressure for opening the first valve portion v1, and a fluid passing through the first valve portion v1 in the open state causes the second valve portion v2 to open, the second valve portion v2 being constituted to cause an opening degree of He first valve portion v1 to increase.

Furthermore, the relief valve 5 includes the valve body 5ai having the first pressure receiving surface and the second pressure receiving surface having a larger area than an area of the first pressure receiving surface, the valve seat 5b with which and from which the valve body 5ai makes contact and separates, and the spring 5c for biasing the valve body 5ai in a closed direction, the first valve portion v1 being constituted by the valve body 5ai and the valve seat 5b, the second valve portion v2 being constituted by the valve body 5ai and an inner peripheral surface of the bore 8c into which the valve body 5ai is inserted, the first pressure receiving surface receiving the discharge pressure of the second piston pump 4 in a case where the first and second valve portions v1, v2 are each closed, the second pressure receiving surface receiving a pressure of the fluid that passes through the first valve portion v1 in a case where the first valve portion v1 is opened.

Furthermore, the first cylinder 2a into which the first piston 8 is inserted and the second cylinder 2b into which the second piston 18 is inserted are integrally formed at the cylinder member 2.

Furthermore, the piston pump further includes the feed pump 25 including the second piston 18, the third pump chamber 27 provided on an opposite side of the second pump chamber 17 relative to the second piston 18, the inlet valve 28 for opening and closing an entrance of the third pump chamber 27, and the outlet valve 29 for opening and closing an exit of the third pump chamber 27, wherein the feed pump 25 pressurizes a fluid in the third pump chamber 27 to be forcedly sent to the first pump chamber 7 in a case where the first and second piston pumps 3 and 4 are in the suction process.

Furthermore, the relief valve 5 causes the discharge fluid from the second pump chamber 17 that is released by passing through the pressure release passage 22 to flow into the third pump chamber 27.

Furthermore, the second cylinder 2b is constituted by the movable cylinder S1 arranged at an outer peripheral side of the second piston 18 so as to be axially movable and into which the second piston 18 is inserted so as to be axially slidable, the second piston 18 of which an axial one end faces the second pump chamber 17 while the axial other end faces the third pump chamber 27, and the movable cylinder S1 and the case for accommodating the first and second pistons 8 and 18 constitute the inlet valves 19 and 28 arranged at an entrance of the second pump chamber 17 and at an entrance of the third pump chamber 27, respectively, the inlet valves 19 and 28 being alternately opened and closed by means of an axial reciprocating movement of the movable cylinder S1, the first and second pistons 8 and 18 constituting the valve portion 31 arranged at an exit of the second pump chamber 17 and the outlet valve 29 arranged at an exit of the third pump chamber 27, the valve portion 31 and the outlet valve 29 being alternately opened and closed by means of an axial relative movement between the first and second pistons 8 and 18, the outlet valve 29 being opened and the valve portion 31 being closed so that the fluid within the third pump chamber 27 is sent to the first pump chamber 7 in a case where the first and second piton pumps 3 and 4 are in the suction process.

Furthermore, the fixed cylinder S2 is provided at an outer peripheral side of the movable cylinder S1, the fixed cylinder including the cutout portions 23 and 24 by means of which the second and third pump chambers 17 and 27 are in communication with the inlet port 1a, respectively, and a movement of the movable cylinder S1 is guided by the fixed cylinder S2.

Furthermore, the valve portion of each of the inlet valves 19 and 28 provided at the entrance of each of the second pump chamber 17 and the third pump chamber 27 are opened and closed by means of the movable cylinder S1 to make contact with and separate from the seal member 26 or 30 provided at the case.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A piston pump comprising:
   a first piston pump including a first piston and a first pump chamber;
   a drive apparatus for driving the first piston pump;
   a second piston pump including a second piston and a second pump chamber having an annular shape to surround the first piston, the second piston operating to follow an operation of the first piston;
   a pressure release passage formed in communication with the second pump chamber;
   a relief valve provided at the pressure release passage and defining an upper limit discharge pressure of the second piston pump; wherein when a discharge pressure of the second piston pump is equal to or smaller than the upper limit discharge pressure, a discharge fluid of the second piston pump is added to a discharge fluid of the first piston pump so as to flow into an outlet port, and when the discharge pressure of the second piston pump exceeds the upper limit discharge pressure, the discharge fluid of the second piston pump is released to the pressure release passage through the relief valve and the discharge fluid of the first piston pump only flows to the outlet port; and
   when a volume of the first pump chamber decreases during movement of the first piston, a volume of the second pump chamber decreases in a state where an entrance of the second pump chamber is closed.

2. A piston pump comprising:
   a first piston pump including a first pump chamber defined by a first cylinder and a first piston of which an end portion faces the first pump chamber;
   a drive apparatus for driving the first piston pump;
   a second piston pump including a second pump chamber defined by a second cylinder and a second piston of which an end portion faces the second pump chamber, the second pump chamber having an annular shape and formed at an outer peripheral side of the first piston, the second piston having an annular shape and arranged at the outer peripheral side of the first piston, the second piston performing a reciprocating movement by following an operation of the first piston;
   a pressure release passage formed in connection with the second pump chamber;
   a relief valve provided at the pressure release passage and defining an upper limit discharge pressure of the second piston pump;
   the first piston pump and the second piston pump including inlet valves respectively, an exit of the second pump chamber being connected to the first pump chamber via the inlet valve of the first piston pump, the pressure release passage being connected to the exit of the second pump chamber; and
   when a volume of the first pump chamber decreases during movement of the first piston, a volume of the second pump chamber decreases in a state where an entrance of the second pump chamber is closed.

3. A piston pump according to claim 2, wherein the fluid from the second piston pump is sent to the first pump chamber via the inlet valve of the first piston pump and flows into an outlet port via an outlet valve of the first piston pump.

4. A piston pump according to claim 2, wherein the second piston is arranged at the outer peripheral side of the first piston so as to be axially movable relative thereto, the first piston including a stopper at an outer periphery for restricting an axial relative movement between the second piston and the first piston to be equal to or smaller than a stroke of the first piston, and a sliding resistance between the second piston and the second cylinder is larger than a sliding resistance between the second piston and the first piston.

5. A piston pump according to claim 4, wherein the first piston includes a flange at the outer periphery for pressing the second piston in a compression process.

6. A piston pump according to claim 5, wherein the inlet valve of the second piston pump is opened and closed by the flange to make contact with and separate from the second piston.

7. A piston pump according to claim 4, wherein an inner peripheral surface of the second piston and an outer peripheral surface of the first piston form a gap therebetween.

8. A piston pump according to claim 2, wherein the second piston includes a slit at an inner peripheral side by of which an exit of the second pump chamber is in communication with an inlet passage of the first piston pump.

9. A piston pump according to claim 2, wherein the fluid from the second pump chamber that is released by passing through the pressure release passage flows back to an entrance side of the second pump chamber.

10. A piston pump according to claim 2, wherein the pressure release passage and the relief valve are arranged inside of the first piston.

11. A piston pump according to claim 2, wherein the second piston is formed by a cup seal made of resin or rubber.

12. A piston pump according to claim 1, wherein the relief valve includes a first valve portion that is opened when the discharge pressure of the second piston pump exceeds the upper limit discharge pressure and a second valve portion that is opened at a lower pressure than a pressure for opening the first valve portion, and a fluid passing through the first valve portion in the open state causes the second valve portion to open, the second valve portion being constituted to cause an opening degree of the first valve portion to increase.

13. A piston pump according to claim 12, wherein the relief valve includes a valve body having a first pressure receiving surface and a second pressure receiving surface having a larger area than an area of the first pressure receiving surface, a valve seat with which and from which the valve body makes contact and separates, and a spring for biasing the valve body in a closed direction, the first valve portion being constituted by the valve body and the valve seat, the second valve portion being constituted by the valve body and an inner peripheral surface of a bore into which the valve body is inserted, the first pressure receiving surface receiving the discharge pressure of the second piston pump in a case where the first and second valve portions are each closed, the second pressure receiving surface receiving a pressure of the fluid that passes through the first valve portion in a case where the first valve portion is opened, the valve body of which the first valve portion and the second valve portion are constituted being the same valve body.

14. A piston pump according to claim 1, wherein a first cylinder into which the first piston is inserted and a second cylinder into which the second piston is inserted are integrally formed at the cylinder member.

15. A piston pump according to claim 1, further comprising a feed pump including the second piston, a third pump chamber provided on an opposite side of the second pump chamber relative to the second piston, an inlet valve for opening and closing an entrance of the third pump chamber, an outlet valve for opening and closing an exit of the third pump chamber, wherein the feed pump pressurizes a fluid in the third pump chamber to be forcedly sent to the first pump chamber in a case where the first and second piston pumps are in a suction process in which volumes of the first pump chamber and the second pump chamber increase along with movements of the first piston and the second piston, respectively, the third pump chamber being defined by the second piston, and a volume of the third pump chamber decreasing when a volume of the second pump chamber increases along with a movement of the second piston.

16. A piston pump according to claim 15, wherein the relief valve causes the discharge fluid from the second pump chamber that is released by passing through the pressure release passage to flow into the third pump chamber.

17. A piston pump according to claim 15, wherein a second cylinder is constituted by a movable cylinder arranged at an outer peripheral side of the second piston so as to be axially movable and into which the second piston is inserted so as to be axially slidable, the second piston of which an axial one end faces the second pump chamber while the axial other end faces the third pump chamber, and the movable cylinder and a case for accommodating the first and second pistons constitute inlet valves arranged at an entrance of the second pump chamber and at an entrance of the third pump chamber respectively, the inlet valves being alternately opened and closed by means of an axial reciprocating movement of the movable cylinder, the first and second pistons constituting a valve portion arranged at an exit of the second pump chamber and an outlet valve arranged at an exit of the third pump chamber, the valve portion and the outlet valve being alternately opened and closed by means of an axial relative movement between the first and second pistons, the outlet valve being opened and the valve portion being closed so that the fluid within the third pump chamber is sent to the first pump chamber in a case where the first and second piston pumps are in the suction process.

18. A piston pump according to claim 17, wherein a fixed cylinder is provided at an outer peripheral side of the movable cylinder, the fixed cylinder including cutout portions by way of which the second and third pump chambers are in communication with the inlet port respectively, and a movement of the movable cylinder is guided by the fixed cylinder.

19. A piston pump according to claim 17, wherein a valve portion of each of the inlet valves provided at the entrance of each of the second pump chamber and the third pump chamber are opened and closed by means of the movable cylinder to make contact with and separate from a seal member provided at the case.

20. A piston pump according to claim 2, wherein the second piston pump supplies fluid, sent to the second pump chamber via the inlet valve of the second piston pump, to the first pump chamber via the inlet valve of the first piston pump.

* * * * *